(12) United States Patent
Koike-Akino et al.

(10) Patent No.: US 8,553,792 B2
(45) Date of Patent: Oct. 8, 2013

(54) NON-COHERENT SPACE-TIME TRELLIS-CODED MODULATIONS FOR NETWORK-CODED WIRELESS RELAY COMMUNICATIONS

(75) Inventors: Toshiaki Koike-Akino, Cambridge, MA (US); Philip V. Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 468 days.

(21) Appl. No.: 13/007,523

(22) Filed: Jan. 14, 2011

(65) Prior Publication Data

US 2012/0183020 A1 Jul. 19, 2012

(51) Int. Cl.
*H04L 23/02* (2006.01)
(52) U.S. Cl.
USPC ........... 375/265; 375/260; 375/267; 370/203; 370/208; 370/210
(58) Field of Classification Search
USPC ........... 375/260, 265, 267; 370/203, 208, 210
See application file for complete search history.

(56) References Cited

PUBLICATIONS

Janani, M.; Hedayat, A.; Nosratinia, A., "Improved super-orthogonal codes through generalized rotations," Global Telecommunications Conference, 2004. GLOBECOM '04. IEEE , vol. 6, No., pp. 3773,3777 vol. 6, Nov. 29-Dec. 3, 2004.*
Lizhong Zheng; Tse, D.N.C., "Communication on the Grassmann manifold: a geometric approach to the noncoherent multiple-antenna channel," Information Theory, IEEE Transactions on , vol. 48, No. 2, pp. 359,383, Feb. 2002.*
Junil Choi; Chance, Z.; Love, D.J.; Madhow, U., "Noncoherent trellis-coded quantization for massive MIMO limited feedback beamforming," Information Theory and Applications Workshop (ITA), 2013 , vol., No., pp. 1,6, Feb. 10-15, 2013.*
Koike-Akino, T.; Orlik, P., "Non-Coherent Grassmann TCM Design for Physical-Layer Network Coding in Bidirectional MIMO Relaying Systems," Communications (ICC), 2011 IEEE International Conference on , vol., No., pp. 1,5, Jun. 5-9, 2011.*

* cited by examiner

*Primary Examiner* — Daniel Washburn
*Assistant Examiner* — Eboni Hughes
(74) *Attorney, Agent, or Firm* — Dirk Brinkman; Gene Vinokur

(57) ABSTRACT

This invention provides a method for jointly optimizing network coding, channel coding, and signal constellations in non-coherent wireless multiple-input multiple-output (MIMO) wireless relay networks for the case when transceivers cannot obtain any knowledge of channel state information (CSI) due to high-speed mobility of the transceivers. In the relay networks, two terminal transceivers simultaneously transmit data to an intermediate relaying transceiver, which in turn broadcasts mixed data using physical-layer network coding to both terminals. The embodiments of this invention exploit different blind space-time trellis-coded modulations (ST-TCM) for each user, whose codebook is jointly generated over a Grassmannian manifold. The method is provided by exponential mapping with affine-lattice convolution for joint optimization of channel coding, modulations, and network coding. The method is designed for fast fading channels with and without interleaving. The method significantly improves performance in non-coherent bidirectional relaying MIMO networks.

12 Claims, 6 Drawing Sheets

100

200

300

500

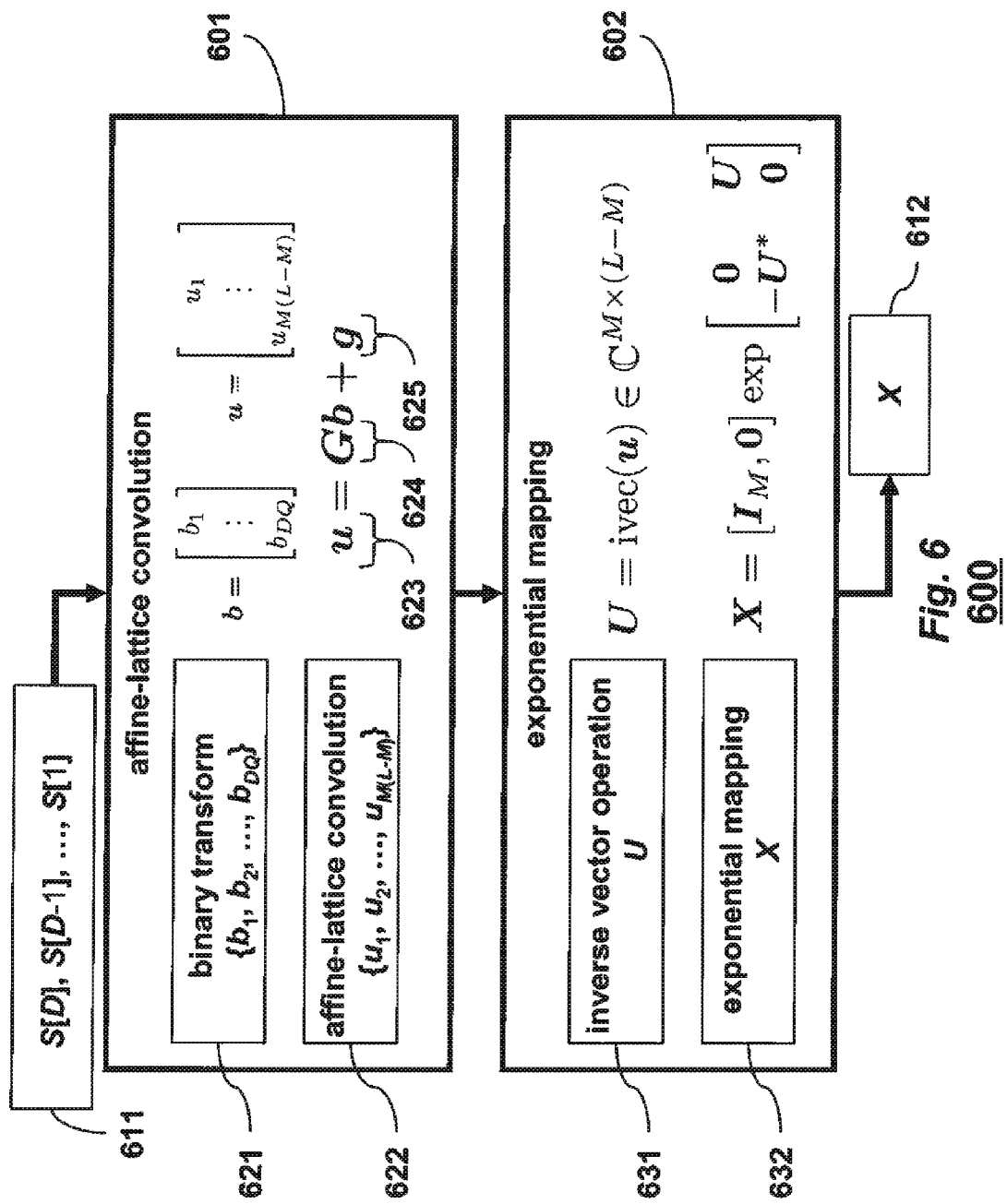

NON-COHERENT SPACE-TIME TRELLIS-CODED MODULATIONS FOR NETWORK-CODED WIRELESS RELAY COMMUNICATIONS

FIELD OF THE INVENTION

This invention relates to communication networks, and more particularly to exchanging data in non-coherent wireless multiple-input multiple-output (MIMO) relay networks.

BACKGROUND OF THE INVENTION

Multiple-input multiple-output (MIMO) wireless networks, in which transceivers are equipped with multiple antennas, can significantly improve data throughput, in particular for multi-hop relaying networks. For such MIMO relay networks, a large number of relaying methods based on physical-layer network coding, e.g., amplify-and-forward (AF) and decode-and-forward (DF), are known.

The most prior art methods exploit coherent signal detections for which accurate channel estimation is required at the receivers. Therefore, those methods do not work well for some communication applications, which experience non-stationary, fast fading channel conditions, especially for rapidly moving mobile transceivers.

Moreover, there are no known methods for optimizing blind space-time modulations for relay networks with physical-layer network coding. To achieve highly reliable networks, it is of great importance to deal with a joint optimization problem of modulations, network coding and channel coding.

SUMMARY OF THE INVENTION

The embodiments of the invention provide a method and network for jointly optimizing signal constellations, channel coding and network coding. The network can be a non-coherent multiple-input multiple-output (MIMO) relay network, wherein transceivers have multiple antennas.

The method is applicable to other networks including wired communication networks, fiber-optics communication networks, and control networks where medium characteristic are modeled by MIMO channel matrices. Because MIMO includes single-input or single-output, the method also works for single-antenna networks. Furthermore, the method offers a large gain in data throughput for any multi-hop relaying networks with multi-way traffic as well as two-hop relaying with two-way traffic described in the preferred embodiments.

The method uses multiple space-time modulations over a Grassmannian manifold in conjunction with physical-layer network coding and trellis coding, in order to realize reliable wireless communications, even without channel estimations.

The invention solves the following four problems that are characteristic of prior art relay communications. Accurate channel estimation is impossible for extremely fast fading channels. The non-coherent detection including differential decoding suffers from severe performance degradations. The decoding reliability is degraded when the relaying transceiver receives multiple data signals at the same time. The channel coding does not achieve good performance unless the coding is jointly optimized with physical-layer network coding and signal constellations.

BRIEF DESCRIPTION OF THE DRAWINGS

FIG. 6 is a block diagram of parametric blind ST-TCM structure according to embodiments of the invention.

DETAILED DESCRIPTION OF THE PREFERRED EMBODIMENTS

Figure 1:
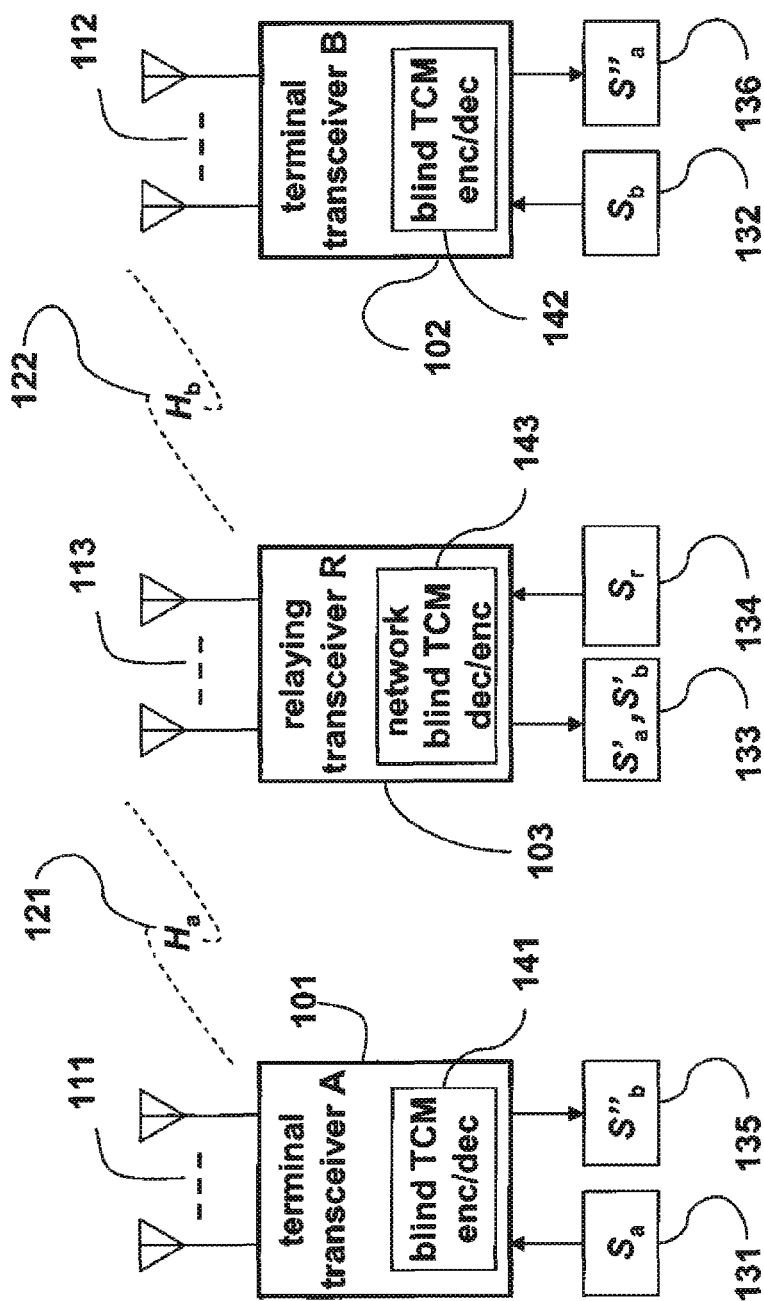
FIG. 1 is a schematic of a non-coherent multiple-input multiple-output (MIMO) wireless relay network according to embodiments of the invention.

As shown in FIG. 1, the embodiments of our invention provide a method and networks for exchanging data, $S_a$ 131 and $S_b$ 132, between a terminal transceiver A 101 and a terminal transceiver B 102 via an intermediate relaying transceiver R 103, in a multiple-input multiple-output (MIMO) wireless relay network 100.

The terminal transceiver A 101 has a set of $M_a$ antennas 111. The terminal transceiver B 102 has a set of $M_b$ antennas 112. The relaying transceiver R 103 has a set of $M_r$ antennas 113.

The data $S_a$ 131 is modulated by blind space-time trellis-coded modulations (ST-TCM) encoder 141, and transmitted by the antennas 111, while the data $S_b$ 132 is modulated by blind ST-TCM encoder 142, and simultaneously transmitted by the antennas 112.

After passing through MIMO channels $H_a$ 121 and $H_b$ 122, the relaying transceiver R receives the transmitted data by the antennas 113. The MIMO channels $H_a$ 121 and $H_b$ 122 are complex-valued matrices of size $M_r$ by $M_a$, and $M_r$ by $M_b$, respectively. Because the extension to frequency-selective fading channels is straightforward with multi-carrier signaling, frequency-flat fading is considered here for simplicity of this description.

After receiving the multiplexed TCM data, the relaying transceiver R decodes the data to obtain the corresponding estimates, $S'_a$ and $S'_b$ 133, though the network blind TCM decoder 143, uses a vector Viterbi procedure for non-coherent maximum-likelihood decoding. The relay transceiver R then encodes the estimates, $S'_a$ and $S'_b$ 133, through the network blind TCM encoder 143 with an intermediate data $S_r$ 134, which is a combination data of $S'_a$ and $S'_b$ 133, according to the network coding, e.g., modulo additions. The network coded data $S_r$ 134 are broadcasted from the relay transceiver R 103 to both terminal transceivers A and B.

The corresponding data received at the terminal transceiver A are decoded to obtain the final estimate $S''_b$ 135 through blind TCM decoder 141 with a priori knowledge of the data $S_a$, through non-coherent maximum-likelihood decoding. In a similar way, the terminal transceiver B obtains the final estimate $S''_a$ 136 by the blind TCM decoder 142 with the data $S_b$ 132.

Figure 2:
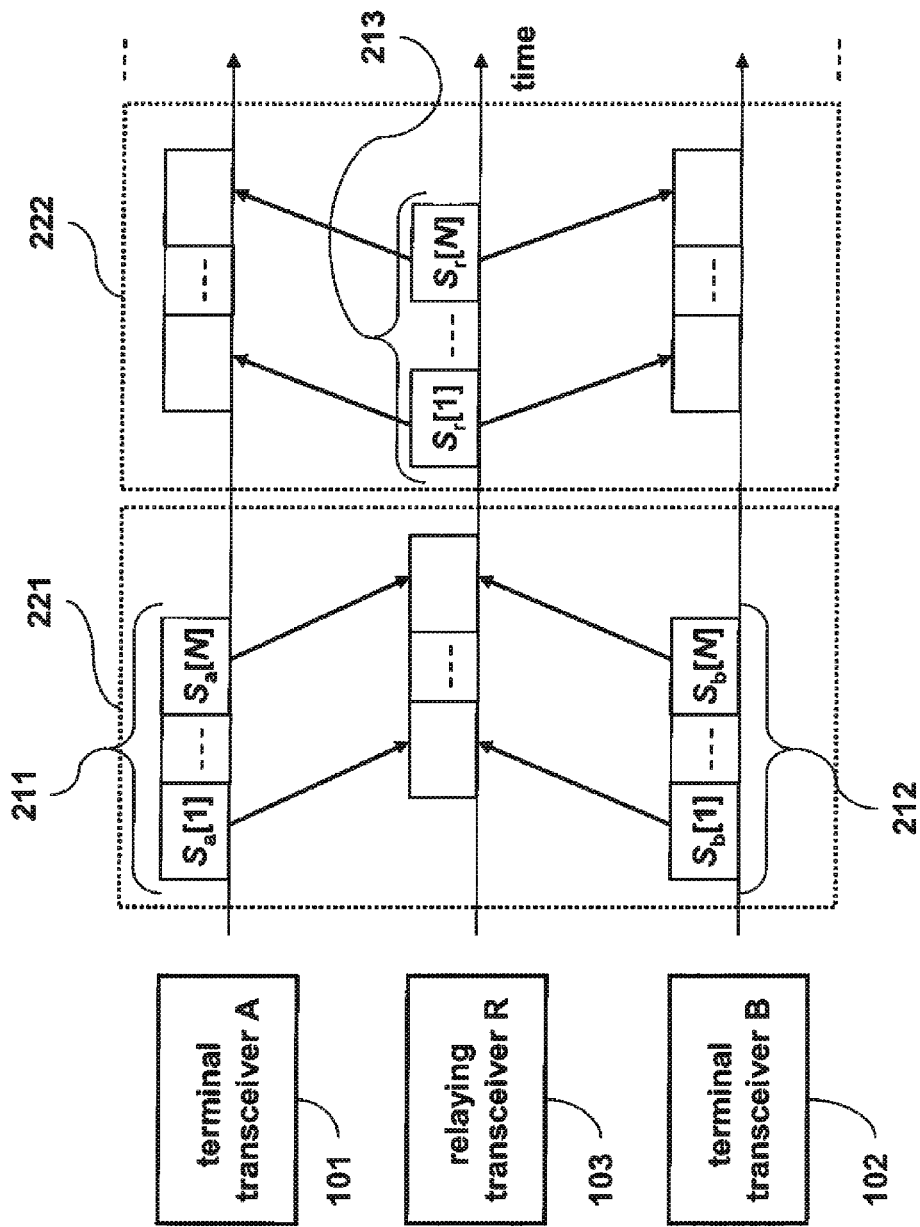
FIG. 2 is a time diagram of a two-phase bidirectional relaying protocol according to embodiments of the invention.

FIG. 2 shows the timing 200 of the above process, where there are two time slots; multiple-access phase, and broadcast phase. In the first time slot 221, both the terminal transceiver A and the terminal transceiver B simultaneously transmit data sequences, $S_a = \{S_a[1], S_a[2], \ldots, S_a[N]\}$ 211 and $S_b = \{S_b[1], S_b[2], \ldots, S_b[N]\}$ 212, to the relay transceiver R. The packet length in block is denoted by N. In the following time slot 222, the relay transceiver R broadcasts the network-coded data sequence, $S_r=\{S_r[1], S_r[2], \ldots, S_r[N]\}$ 213, to both the terminal transceivers A and B.

Figure 3:
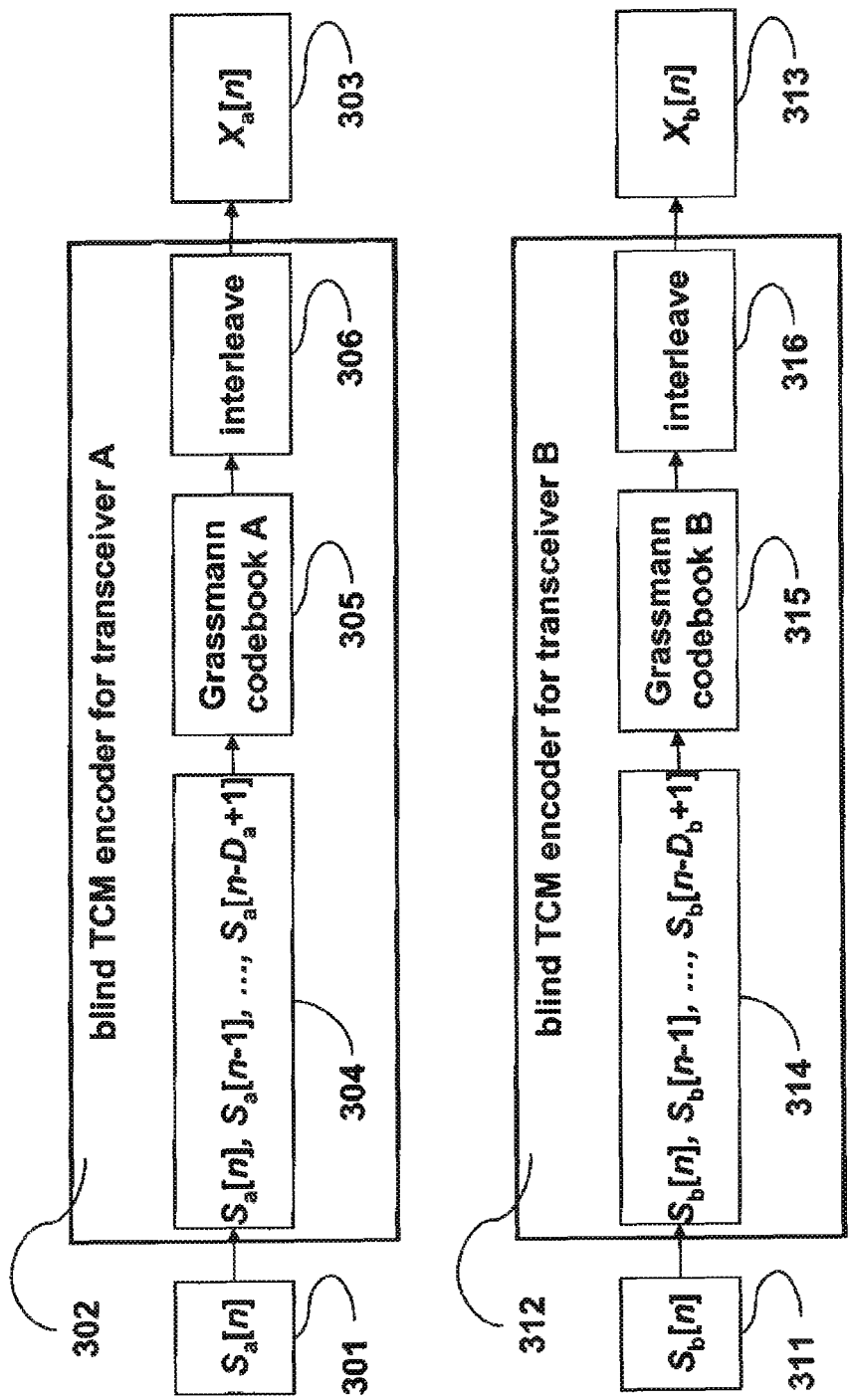
FIG. 3 is a block diagram of blind space-time trellis-coded modulation (ST-TCM) encoders according to embodiments of the invention.

FIG. 3 shows space-time TCM encoders 300 used in the first phase, wherein data $S_a[n]$ 301 at time instance of the n-th block is modulated to produce transmitted data $X_a[n]$ 303 through the encoder 302 at the terminal transceiver A. The modulated data $X_a[n]$ 303 is then transmitted by multiple antennas. Letting L be the block length in symbol, the data $X_a[n]$ 303 is a complex-valued matrix of size $M_a$ by L. In the blind space-time TCM encoder, data $S_a[n]$ are stored in a delay-line buffer memory 304 to construct a set of consecutive data $\{S_a[n], S_a[n-1], S_a[n-D_a+1]\}$, where $D_a$ is a constraint length of trellis coding or the memory size. According to the stored data set, the corresponding codeword in the codebook is selected at the coding block 305, and the codeword is transmitted with or without interleaving 306. The interleaving block is optional because interleaving improves the diversity order in high signal-to-noise ratio (SNR) regimes, whereas interleaving suffers from slight performance degradations in low SNR regimes.

Figure 4:
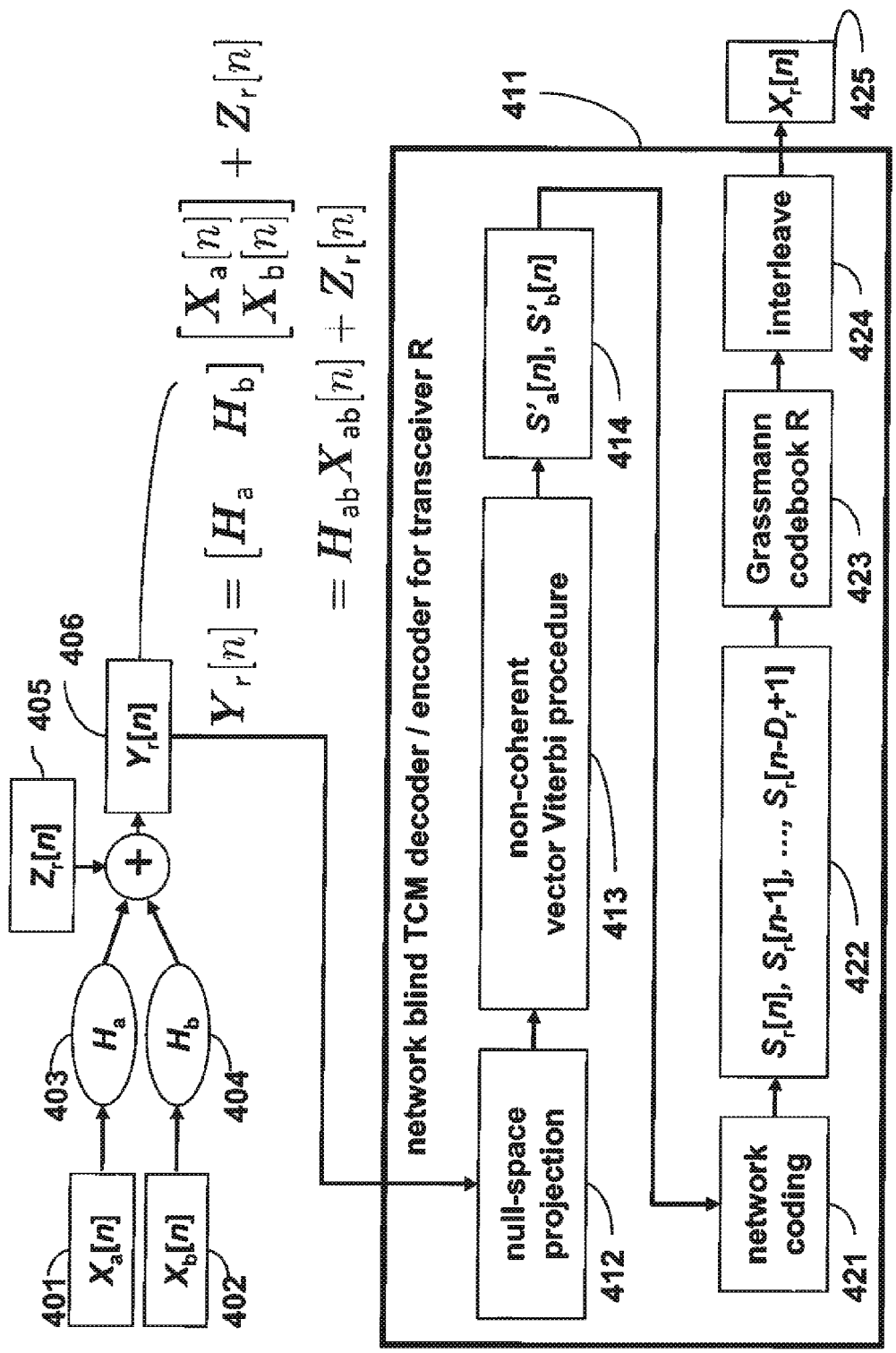
FIG. 4 is a block diagram of a relaying process based on network-coded blind ST-TCM according to embodiments of the invention.

The same process takes place in the blind space-time TCM encoder 312 at the terminal transceiver B. A key idea behind the invention lies in the specific codebook 315, which is generated to be substantially orthogonal to the codebook 305 at the terminal transceiver A through the consideration of physical-layer network coding at the relay transceiver R. The substantially orthogonal codebooks solves potential performance degradations due to inter-channel interference cased by simultaneous transmissions in multiple-access phase, As shown in FIG. 4, after receiving the TCM data transmitted during the multiple-access phase, the relaying transceiver R performs a network-coded forwarding process 411. The received data at the relay transceiver R is expressed by the TCM data from A, $X_a[n]$ 401, and that from B, $X_a[n]$ 402, as follows;

$$Y_r[n] = [H_a \ H_b]\begin{bmatrix} X_a[n] \\ X_b[n] \end{bmatrix} + Z_r[n]$$
$$= H_{ab}X_{ab}[n] + Z_r[n]$$

where $Y_r[n]$ 406 is the received data matrix of size $M_r$ by L, the data $Z_r[n]$ 405 is the additive receiver noise matrix of the same size at the n-th block. We define a compound channel matrix $H_{ab}$, which is concatenated of two channel matrices $H_a$ 403 and $H_b$ 404 to become a matrix size of $M_r$ by $M_a+M_b$. Here, the concatenation of two TCM data, $X_a[n]$ 401 and $X_b[n]$ 402, is defined by a compound data matrix $X_{ab}[n]$ of size $M_a+M_b$ by L In the forwarding process 411, the relay transceiver R estimates the data $S'_a[n]$ and $S'_b[n]$ 414, which is the most likely to be the data $X_a$ and $X_b$, using null-space projection 412 at each compound codeword, followed by a non-coherent vector Viterbi procedure 413. The null-space projection 412 performs a matrix multiplication of a projector matrix $X_{ab}^O$ and a squared matrix norm $\|\cdot\|^2$ for any possible compound codeword $X_{ab}$ as follows;

$$\|Y_r[n]X_{ab}^O\|^2 = \|Y_r[n](I_L - X_{ab}^*(X_{ab}X_{ab}^*)^{-1}X_{ab})\|^2,$$

which becomes zero if $Y_r[n]=X_{ab}$ because $X_{ab}X_{ab}^O=0$. Here, super-script operations $[.]^O$, $[.]^*$ and $[.]^{-1}$ denote the orthogonal projection, the Hermitian transpose and the inverse of a matrix, respectively. The matrix $I_L$ denotes the identity matrix of size L by L. Every squared norm computed at null-space projection 412 is used as a branch metric for vector Viterbi algorithm 413 to search for the most likely estimates independent of the CSI. The branch-metric computation can be extended to multiple blocks and higher-order regressions to improve performance.

The estimated data, $S'_a[n]$ and $S'_b[n]$ 414, are then combined by network coding function 421 to generate a network-coded data $S_r[ii]$. The network-coded data is stored in a delay-line memory 422 and encoded through Grassmann code selection 423. During the broadcast phase, the relay transceiver R broadcasts the network-coded TCM data $X_r[n]$ 425 with or without interleaving 424. At the terminal transceiver A and B, the network-coded TCM data passed through the MIMO channels are decoded by a non-coherent Viterbi procedure. The blind ST-TCM codebooks for the terminal transceivers A and B have been optimized in advance by the compound TCM codebook $\{X_{ab}\}$.

Figure 5:
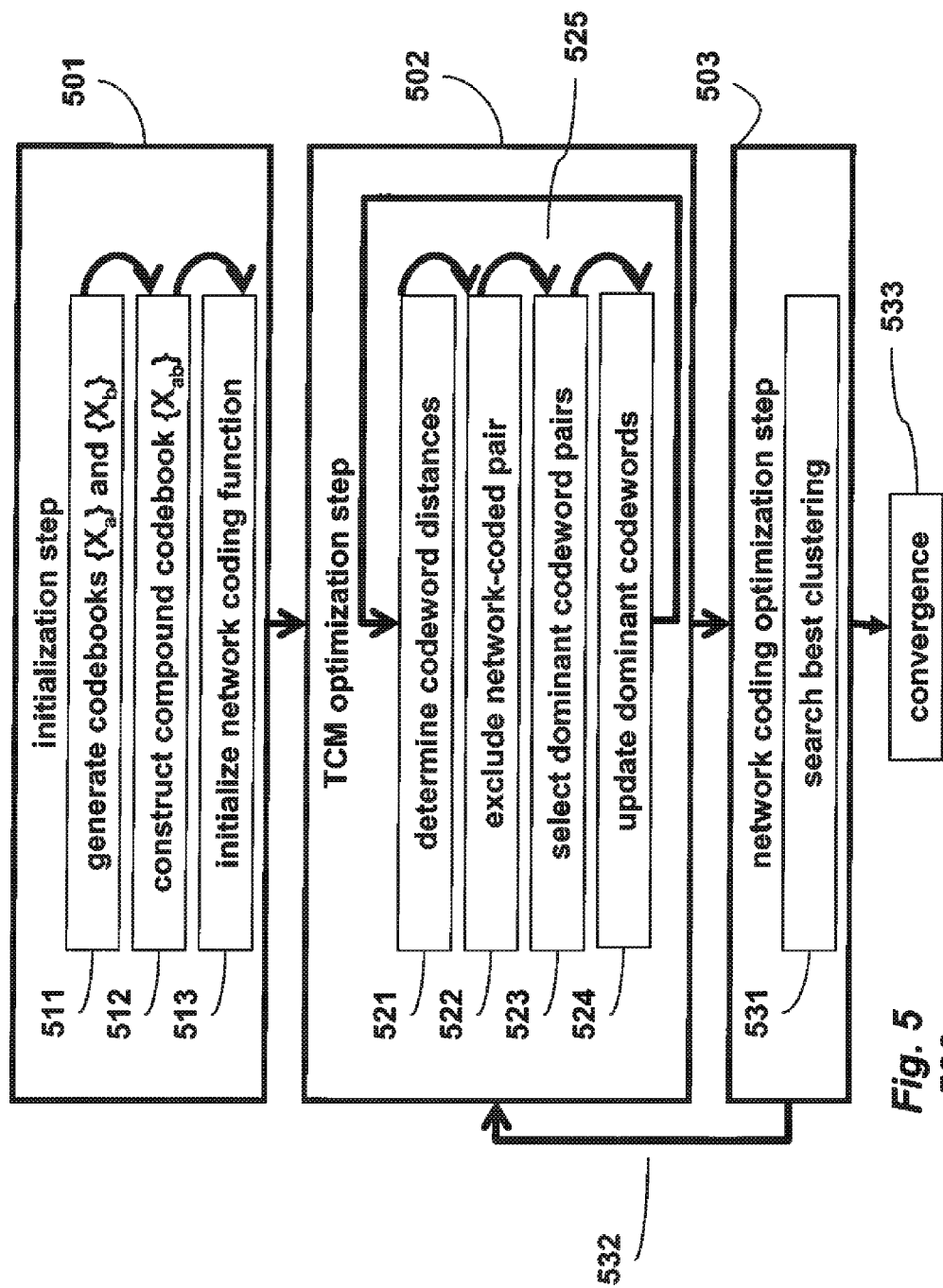
FIG. 5 is a block diagram of a joint optimization of network coding, channel coding and signal constellations according to embodiments of the invention.

FIG. 5 shows the method 500 for jointly optimizing channel coding, signal constellations, and network coding. The optimization method iteratively maximizes a minimum distance of the network-coded TCM codeword sequences through the use of a gradient procedure. The method includes: initialization 501, TCM optimization 502, and network coding optimization 503.

In the initialization step 501 of the method 500, the codebooks $\{X_a\}$ and $\{X_b\}$ are generated 511 for each transceiver, e.g. by unitary space-time modulations optimized for one-way communications independent of the network coding. The compound TCM codebook $\{X_{ab}\}$ is constructed 512 by Cartesian product of those codebooks $\{X_a\}$ and $\{X_b\}$. In addition, the network coding function is initialized up 513, e.g. by well-known exclusive- or (XOR) operations.

In the TCM optimization step 502, the codeword distance of the compound TCM $\{X_{ab}\}$ for any possible sequence pair of codewords $X_a$ and $X_b$ is determined 521 along the trellis-state diagram. Here, the codeword distance is based on either trace criterion or determinant criterion, which are good criteria for ST-TCM in low and high SNR regimes. In one embodiment, the TCM is a non-coherent space-time TCM independent of the network coding.

After excluding the codeword pairs that have an identical network coding output 522, select 523 some minimum distance codeword pairs as dominant codeword pairs. The dominant codewords are updated 524 by gradient procedure over Grassmannian manifold. This TCM optimization step iterates 525 until convergence.

In the network coding optimization step 503, the network coding function is updated to maximize the codeword distance of the compound TCM codebook obtained in the previous step. This is done by combinatorial search using a clustering function 531.

Because the search space is generally large for the combinatorial optimization, well-known successive clustering procedure based on a greedy method is used. If the updated network coding is the same as the old one, then the method stops and provides the optimized TCM and network coding.

Otherwise, the TCM optimization step and the network optimization step are iterated 532 until the convergence 533.

The steps of the above method, as well as other methods shown in the Figure can be performed in processors in the transceivers connected to memories and input/output interfaces as known in the art.

In addition to optimizing the non-parametric ST-TCM codebook over Grassmannian manifold, the embodiments of the invention provide a parametric ST-TCM codebook structure, which accelerates a convergence speed of gradient method in the TCM optimization step 502. For generating a non-parametric ST-TCM codebook, every codeword is directly updated. Hence, the number of parameters to be optimized becomes extremely large for high-rate codes, the fact of which leads to a slow convergence in a gradient method. The parametric ST-TCM structure significantly decreases the total number of optimization parameters to boost the convergence speed.

FIG. 6 shows the parametric blind ST-TCM structure 600, which uses an exponential mapping 602 to convert a vector space into Grassmannian manifold by an affine-lattice convolution 601 to generate offset lattice points from a trellis-state diagram. This structure generates each ST-TCM codeword $\{X\}$ 612 from the data $\{S[D], S[D-1],\ldots S[1]\}$ 611 stored in the trellis memory of size D. Here, the subscript of the transceiver indication is omitted for simplicity; namely, e.g. $\{X\}=\{X_a\}$ for the transceiver A, and $D=D_r$ for the transceiver R.

The input data $\{S[D], S[D-1], \ldots, S[1]\}$ 611 are first transformed into a binary-valued vector $b=[b_1, b_2, \ldots, b_{DQ}]^*$ of size DQ 621, where $b_i$ is either 0 or 1, and Q is the number of bits to represent data S[d]. Through the affine-lattice convolution 622, the binary vector b is then transformed into a lattice point 622 as follows;

$$u = Gb+g,$$

where $u=[u_1, u_2, \ldots, u_{M(L-M)}]^*$ 623 is the lattice point vector of size M(L−M), the complex-valued matrix G 624 is a lattice generator matrix of size M(L−M) by DQ, and the complex-valued vector g 625 is an affine offset vector of size M(L−M). Note that M is the number of antennas used at the transceiver.

The affine-convoluted lattice point u 623 is converted to a matrix U 631 via the inverse vector operation as follows;

$$U = ivec(u) \in \mathbb{C}^{M \times (L-M)}$$

where the inverse vector operation, ivec(.), aligns a vector into a matrix column-wise, and $\mathbb{C}^{M \times (L-M)}$ means that the matrix U is a complex-valued matrix of size M by L−M. The matrix U 631 is mapped into a codeword point X 612 on Grassmannian manifold via exponential mapping as follows;

$$X = [I_M, 0]\exp\begin{bmatrix} 0 & U \\ -U^* & 0 \end{bmatrix},$$

which guarantees that every codeword point X becomes unitary as $XX^*=I_M$ for any arbitrary matrix U.

The ST-TCM optimization method 500 is slightly modified to take advantage of faster convergence with the parametric TCM codebook as follows. In the initialization step 501, the codebooks $\{X_a\}$ and $\{X_b\}$ are generated with randomly selected generator matrices $G_a$ and $G_b$ and random offset vectors $g_a$ and $g_b$. In the TCM optimization step 502, the gradient method is adopted to update those parameters, $G_a$, $G_b$, $g_a$, and $g_b$. This parameterization considerably reduces the total number of optimization variables, more specifically from $(2^{D_aQ_a}M_a+2^{D_bQ_b}M_b)L$ to $M_a(L-M_a)(D_aQ_a+1)+M_b(L-M_b)(D_bQ_b+1)$. For example, the number of optimization variables significantly decreases from 4096 to 72 for $M_a=M_b=2$, $D_a=D_b=2$, $Q_a=Q_b=4$, and L=4. This optimization is a practical Grassmann packing with a network coding constraint.

Effect of the Invention

The above described method achieves substantially optimal TCM codebook and network coding for non-coherent MIMO relay networks, whereas the conventional schemes are far from optimal because channel coding, network coding, and modulations are independently optimized.

Compared to the conventional relay methods, the invention has the following advantages.

The method does not require CSI knowledge, which leads to the advantage in non-stationary fast fading channels.

The method does not suffer from inter-carrier interference in multiple-access channel, wherein data are transmitted at the same time, by using different codebooks which are generated to be substantially orthogonal.

The method solves a performance degradation of general non-coherent modulations by introducing ST-TCM due to additional coding gains.

The method offers a systematic way to optimize both non-parametric and parametric ST-TCM over Grassmannian manifold.

The parametric TCM structure provides a fast convergence in gradient optimizations as a practical Grassmann packing.

The gradient optimization can be replaced by any other numerical optimization method such as genetic procedure and divide-and-concur.

The method is applicable to other networks including wired communications, fiber-optics communications, and control networks whose medium characteristic are modeled by MIMO channel matrices. Because MIMO includes single-input or single-output, the method works for single-antenna networks as well.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:
1. A method for jointly optimizing signal constellations, channel coding and network coding in a network including a first terminal transceiver, a second terminal transceiver and a relay transceiver, comprising the steps of:
   initializing, which comprises the steps of:
   generating a first codebook $[X_a]$ for the first transceiver and a second codebook $[X_b]$ for the second transceiver;
   constructing a compound codebook $[X_{ab}]$ from the first codebook $[X_a]$ and the second codebook $[X_b]$; and
   initializing a network coding function;
   optimizing of a trellis-coded modulation (TCM), which comprises the steps of:
   determining a distance of a compound TCM for all possible pairs of codewords $X_{ab}$ in the compound codebook $[X_{ab}]$ along a trellis-state diagram;
   excluding the pairs of codewords that have an identical network coding output;
   selecting the pairs of codewords $X_{ab}$ having minimum distances as dominant codeword pairs; and
   updating the pairs of dominant codewords by a gradient procedure over a Grassmannian manifold, and iterating over the optimization of the TCM until convergence to produce a network coding function to jointly optimize the signal constellations and the channel coding; and
   optimizing the network coding function, which comprises the steps of:
   maximizing the pairs of dominant codewords, and iterating over the optimizing of the TCM and the optimizing of the network coding function until the network coding function is identical over two successive iterations to jointly optimize the signal constellations, the channel coding and the network coding, wherein the steps are performed in processors.

2. The method of claim 1, wherein the codebooks are generated by unitary space-time modulations optimized for one-way communications independent of the network coding, and the compound codebook is a Cartesian product of the first codebook and the second codebook and the network coding function is initialized by an exclusive-or (XOR) operation.

3. The method of claim 1, wherein the codeword distances are based on a trace criterion.

4. The method of claim 1, wherein the codeword distances are based on a determinant criterion.

5. The method of claim 1, wherein the maximizing uses a greedy combinatorial search using a successive clustering function.

6. The method of claim 1, wherein the TCM is non-coherent space-time TCM independent of the network coding.

7. The method of claim 1, wherein the optimizing of the TCM uses an exponential mapping to convert a vector space into the Grassmannian manifold using an affine-lattice convolution to generate offset lattice points from a trellis-state diagram.

8. The method of claim 1, wherein the first codebook $\{X_a\}$ is substantially orthogonal to the second codebook $\{X_b\}$.

9. The method of claim 1, further comprising:
transmitting, by the first transceiver a particular code word $X_a$ corresponding to data $S_a$ while simultaneously transmitting by the second transceiver a particular code word $X_b$ corresponding to data $S_b$.

10. The method of claim 9, further comprising: receiving the particular codewords $X_a$ and $X_b$ at the relay transceiver estimating data, $S'_a$ and $S'_b$ using a null-space followed by a non-coherent vector Viterbi procedure;
combining $S'_a$ and $S'_b$ by the network coding function to generate network coded data $S_r$; and broadcasting the network coded data to the first transceiver and the second transceiver.

11. The method of claim 1 wherein the first transceiver, the second transceiver and the relay transceiver each has multiple antennas.

12. The method of claim 1, in which the first and second codebooks are generated with randomly selected generator matrices and random offset vectors.

* * * * *